US007996254B2

(12) United States Patent
Bateni et al.

(10) Patent No.: US 7,996,254 B2
(45) Date of Patent: Aug. 9, 2011

(54) METHODS AND SYSTEMS FOR FORECASTING PRODUCT DEMAND DURING PROMOTIONAL EVENTS USING A CAUSAL METHODOLOGY

(75) Inventors: Arash Bateni, Toronto (CA); Edward Kim, Toronto (CA); Harminter Atwal, Framingham, MA (US); Jean-Philippe Vorsanger, Toronto (CA)

(73) Assignee: Teradata US, Inc., Dayton, OH (US)

( * ) Notice: Subject to any disclaimer, the term of this patent is extended or adjusted under 35 U.S.C. 154(b) by 860 days.

(21) Appl. No.: 11/938,812

(22) Filed: Nov. 13, 2007

(65) Prior Publication Data
US 2009/0125375 A1 May 14, 2009

(51) Int. Cl.
*G06Q 99/00* (2006.01)
(52) U.S. Cl. ........................... 705/7.35; 705/7.31
(58) Field of Classification Search .............. 705/1.1, 705/10, 37, 400, 7.31, 7.35
See application file for complete search history.

(56) References Cited

U.S. PATENT DOCUMENTS

| 5,446,890 A * | 8/1995 | Renslo et al. ............ 1/1 |
| 7,251,589 B1 * | 7/2007 | Crowe et al. ............ 702/189 |
| 7,424,440 B1 * | 9/2008 | Gupta et al. ............ 705/10 |
| 7,778,853 B2 * | 8/2010 | Sussman et al. ......... 705/5 |
| 2002/0169657 A1 * | 11/2002 | Singh et al. ............ 705/10 |
| 2005/0256759 A1 * | 11/2005 | Acharya et al. ......... 705/10 |
| 2008/0033772 A1 * | 2/2008 | Endou et al. ............ 705/7 |

OTHER PUBLICATIONS

Engle, Robert; "GARCH 101: The Use of ARCH/GARCH Models in Applied Econometrics", Autumn 2001, Journal of Economic Perspectives; vol. 15, No. 4, pp. 157-168.*
Starica, Catalin; "Is GARCH (1,1) As Good a Model As the Nobel Accolades Would Imply?", Oct. 13, 2003, 50 pgs.*
"GARCH 101: The Use of ARCH/GARCH Models in Applied Econometrics", Autumn 2001, The Journal of Economic Perspectives, vol. 15, No. 4 pp. 157-168.*
Starica, Catalin; "Is GARCH (1,1) As Good a Model As the Nobel Accolades Would Imply?", Oct. 13, 2003, 50 pgs.*
Dawes, John; "Assessing the Impact of a Very Successful Price Promotion on Brand, Category and Competitor Sales", 2004, vol. 13 Iss: 5; The Journal of Product and Brand Management, p. 303-314.*

* cited by examiner

*Primary Examiner* — John W Hayes
*Assistant Examiner* — Freda A Nelson
(74) *Attorney, Agent, or Firm* — James Stover

(57) ABSTRACT

An improved method for forecasting and modeling product demand for a product during promotional periods. The forecasting methodology employs a multivariable regression model to model the causal relationship between product demand and the attributes of past promotional activities. The model is utilized to calculate the promotional uplift from the coefficients of the regression equation. The methodology utilizes a mathematical formulation that transforms regression coefficients, a combination of additive and multiplicative coefficients, into a single promotional uplift coefficient that can be used directly in promotional demand forecasting calculations.

2 Claims, 5 Drawing Sheets

METHODS AND SYSTEMS FOR FORECASTING PRODUCT DEMAND DURING PROMOTIONAL EVENTS USING A CAUSAL METHODOLOGY

CROSS REFERENCE TO RELATED APPLICATIONS

This application claims priority under 35 U.S.C. §119(e) to the following co-pending and commonly-assigned patent application, which is incorporated herein by reference:

Application Ser. No. 11/613,404, entitled "IMPROVED METHODS AND SYSTEMS FOR FORECASTING PRODUCT DEMAND USING A CAUSAL METHODOLOGY," filed on Dec. 20, 2006, by Arash Bateni, Edward Kim, Philip Liew, and J. P. Vorsanger.

FIELD OF THE INVENTION

The present invention relates to methods and systems for forecasting product demand for retail operations, and in particular to the forecasting of product demand during promotional events.

BACKGROUND OF THE INVENTION

Accurately determining demand forecasts for products are paramount concerns for retail organizations. Demand forecasts are used for inventory control, purchase planning, work force planning, and other planning needs of organizations. Inaccurate demand forecasts can result in shortages of inventory that are needed to meet current demand, which can result in lost sales and revenues for the organizations. Conversely, inventory that exceeds a current demand can adversely impact the profits of an organization. Excessive inventory of perishable goods may lead to a loss for those goods.

Teradata, a division of NCR Corporation, has developed a suite of analytical applications for the retail business, referred to as Teradata Demand Chain Management (DCM), that provides retailers with the tools they need for product demand forecasting, planning and replenishment. Teradata Demand Chain Management assists retailers in accurately forecasting product sales at the store/SKU (Stock Keeping Unit) level to ensure high customer service levels are met, and inventory stock at the store level is optimized and automatically replenished. Teradata DCM helps retailers anticipate increased demand for products and plan for customer promotions by providing the tools to do effective product forecasting through a responsive supply chain.

As illustrated in FIG. 1, the Teradata Demand Chain Management analytical application suite 101 is shown to be part of a data warehouse solution for the retail industries built upon NCR Corporation's Teradata Data Warehouse 103, using a Teradata Retail Logical Data Model (RLDM) 105. The key modules contained within the Teradata Demand Chain Management application suite 101, are:

Contribution: Contribution module 111 provides an automatic categorization of SKUs, merchandise categories and locations based on their contribution to the success of the business. These rankings are used by the replenishment system to ensure the service levels, replenishment rules and space allocation are constantly favoring those items preferred by the customer.

Seasonal Profile: The Seasonal Profile module 112 automatically calculates seasonal selling patterns at all levels of merchandise and location. This module draws on historical sales data to automatically create seasonal models for groups of items with similar seasonal patterns. The model might contain the effects of promotions, markdowns, and items with different seasonal tendencies.

Demand Forecasting: The Demand Forecasting module 113 provides store/SKU Level forecasting that responds to unique local customer demand. This module considers both an item's seasonality and its rate of sales (sales trend) to generate an accurate forecast. The module continually compares historical and current demand data and utilizes several methods to determine the best product demand forecast.

Promotions Management: The Promotions Management module 114 automatically calculates the precise additional stock needed to meet demand resulting from promotional activity.

Automated Replenishment: Automated Replenishment module 115 provides the retailer with the ability to manage replenishment both at the distribution center and the store levels. The module provides suggested order quantities based on business policies, service levels, forecast error, risk stock, review times, and lead times.

Time Phased Replenishment: Time Phased Replenishment module 116 Provides a weekly long-range order forecast that can be shared with vendors to facilitate collaborative planning and order execution. Logistical and ordering constraints such as lead times, review times, service-level targets, min/max shelf levels, etc. can be simulated to improve the synchronization of ordering with individual store requirements.

Allocation: The Allocation module 115 uses intelligent forecasting methods to manage pre-allocation, purchase order and distribution center on-hand allocation.

Load Builder: Load Builder module 118 optimizes the inventory deliveries coming from the distribution centers (DCs) and going to the retailer's stores. It enables the retailer to review and optimize planned loads.

Capacity Planning: Capacity Planning module 119 looks at the available throughput of a retailer's supply chain to identify when available capacity will be exceeded.

Promotional demand forecasting is an important part of the Teradata Demand Chain Management (DCM) application suite described above. The accuracy of forecasts provided by the DCM application essentially relies on the calculation and utilization of promotional uplift coefficients to increase demand forecasts during the promotional activities. Currently promotional uplift coefficients are calculated by the Automatic Event Uplift (AEU) module, which is the core of the DCM Promotions Management module 114. The AEU module calculates expected product demand using historical data, and then calculates a promotional uplift as the average ratio of the historical promotional demand over the expected product demand.

The discussion which follows introduces a new set of techniques, numerical models and mathematical formulations that can calculate the promotional uplifts with more accuracy and consistency, particularly when dealing with multiple event types and price discounts. These improvements can provide better demand forecasting and a higher reliability of the DCM suite of products.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

In various embodiments of the present invention, product data is housed in a data store. In one embodiment, the data store is a data warehouse, such as a Teradata data warehouse, distributed by NCR Corporation of Dayton, Ohio. Various data store applications interface to the data store for acquiring and modifying the product data. Of course as one of ordinary skill in the art readily appreciates, any data store and data store applications can be used with the teachings of the present disclosure. Thus, all such data store types and applications fall within the scope of the present invention.

The Teradata Demand Chain Management suites of products, as discussed above, models historical sales data to forecast future demand of products. The DCM system also generates a promotional demand forecast by multiplying a revised demand forecast by an uplift coefficient. For example, a revised, or baseline, demand forecast of 100 units with an uplift of 2.5 gives a promotional forecast of 250 units. Promotional uplift coefficients are calculated by the Automatic Event Uplift (AEU) module, which is the core of the DCM Promotions Management module 114. AEU calculates expected product demand using historical data, and then calculates a promotional uplift coefficient as the average ratio of the historical promotional demand over the non-promotional product demand.

Figure 1:
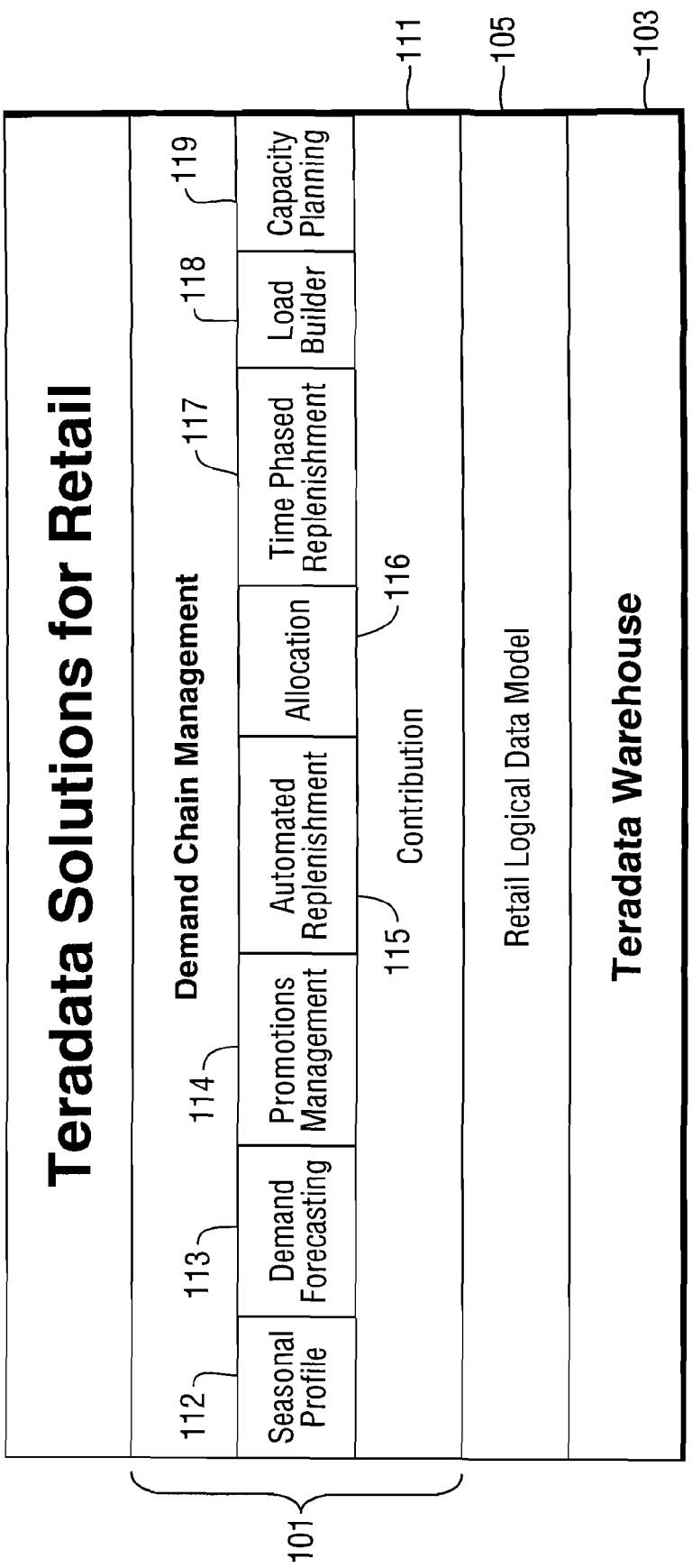
FIG. 1 provides an illustration of a forecasting, planning and replenishment software application suite for the retail industries built upon NCR Corporation's Teradata Data Warehouse.
Figure 2:
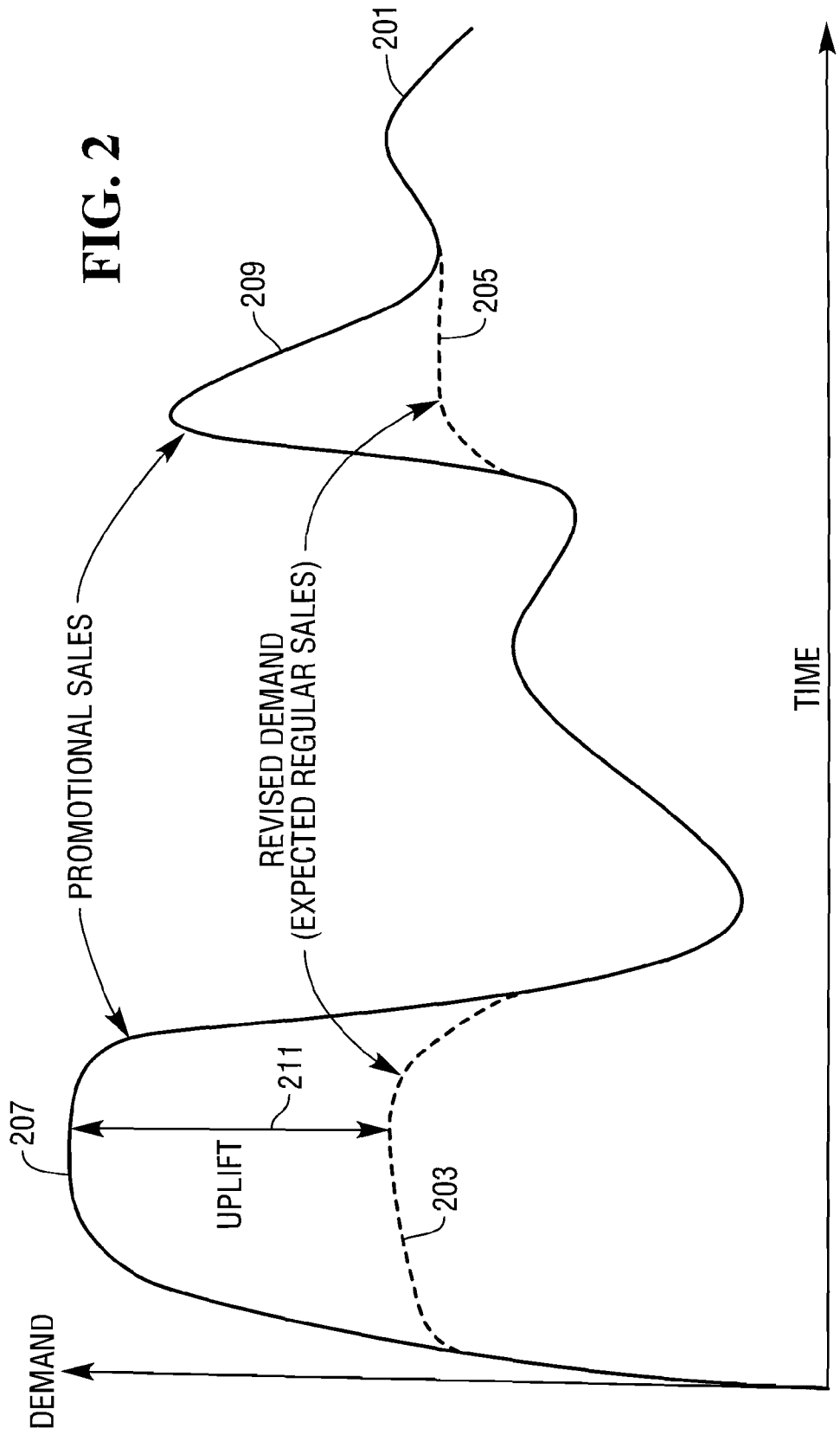
FIG. 2 is a graph illustrating the difference in product demand over time for promotional and non-promotional periods.

A graph illustrating the difference in product demand over time for promotional and non-promotional periods is provided in FIG. 2. Graph 201, including graph segments 203 and 205, illustrates the regular sales activity for an exemplary product. Promotional product sales activity is represented by graph segments 207 and 209. The increase in demand over regular sales activity during the promotional periods represented by graph section 207 and 209 is referred to as the promotional uplift.

Figure 3:
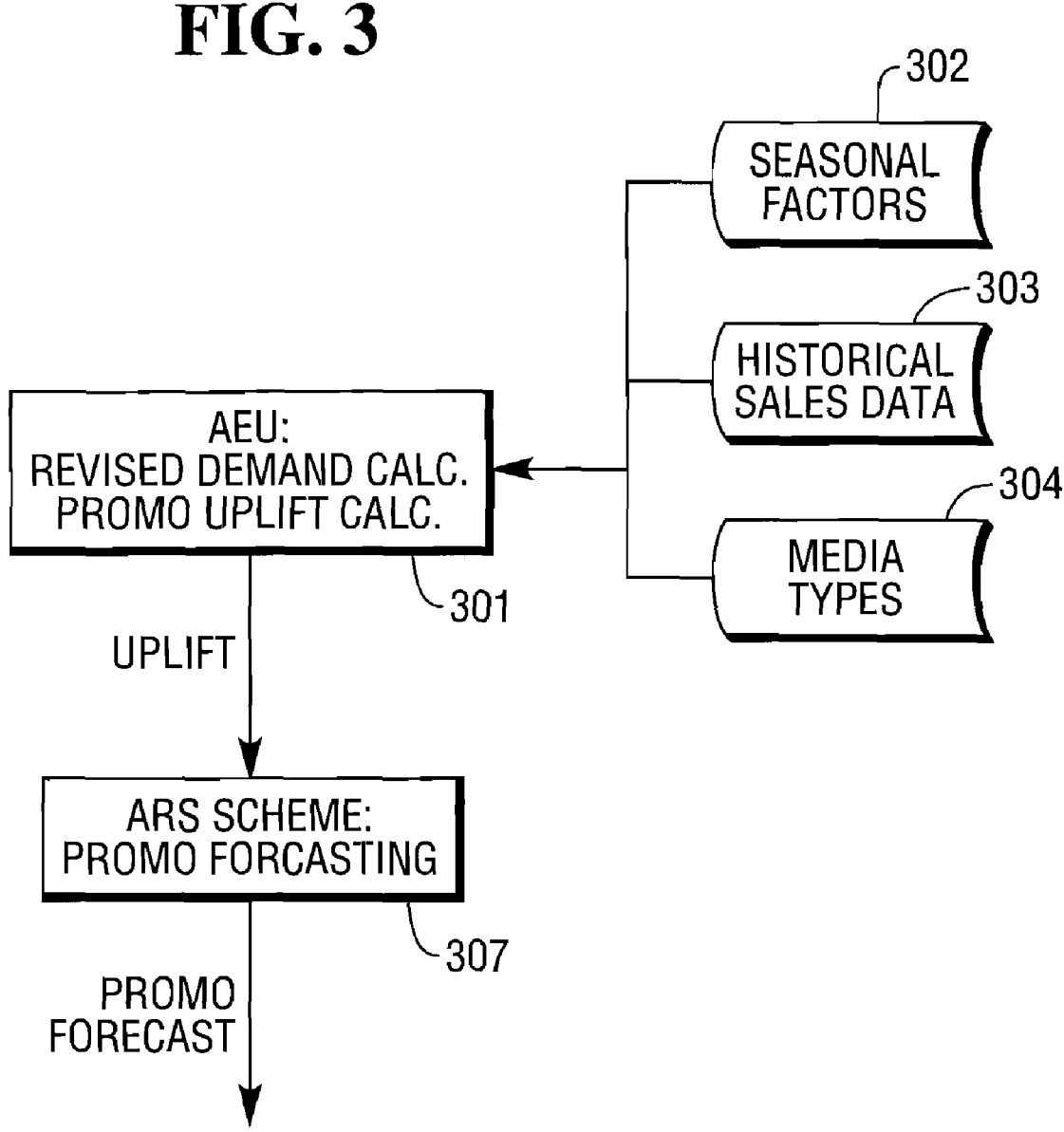
FIG. 3 is a flow chart illustrating a current method for determining product demand forecasts during product promotional periods.

FIG. 3 is a simple flow chart illustrating a current method for determining product demand forecasts during product promotional periods. As part of the DCM demand forecasting process, seasonal adjustment factors 302, historical sales data 303, and other information, such as media types 304, are saved for each product or service offered by a retailer. In step 301, the Automatic Event Uplift (AEU) module, which is the core of the DCM Promotion Manager module 114, calculates the revised demand forecast using the historical data 303, and then calculates the promotional uplift coefficient as the average ratio of the historical promotional demand over the non-promotional demand.

In step 307, the promotional uplift is then input into the DCM Average Rate of Sale (ARS) calculations performed within the Demand Forecasting module 113 to estimate the promotional demand forecast.

The improved demand forecasting technique described herein employs a multivariable regression model to model the causal relationship between product demand and the attributes of past promotional activities. The model is utilized to calculate the promotional uplift from the coefficients of the regression equation. The methodology consists of two main steps a) regression: calculation of regression coefficients, and b) coefficient transformation: calculation of the promotional uplift.

The methodology utilizes a mathematical formulation that transforms regression coefficients—a combination of additive and multiplicative coefficients—into a single promotional uplift coefficient that can be used by the DCM system for promotional demand forecasting. Employing multivariable regression models would not be possible for uplift calculation without the presented transformation technique.

The multivariable regression equation can be expressed as:

$$\text{demand} = a + b \cdot \text{promo}_k + c \cdot \text{decay} + d \cdot \text{price} + \ldots \qquad \text{Eq. (1)}$$

Equation 1 includes causal variables $\text{promo}_k$, a binary promotional flag for media type k; decay, a binary flag indicating the promotional decay; and price, the unit price for a given week. Regression coefficients included in equation 1 are: a, the intercept; b and c, the additive uplifts due to promotion or decay, respectively; and d, the multiplicative price elasticity. The procedure described below transforms the regression coefficients a, b, c and d into a single multiplicative uplift coefficient to be used in the ARS forecasting scheme employed within the DCM application.

Figure 4:
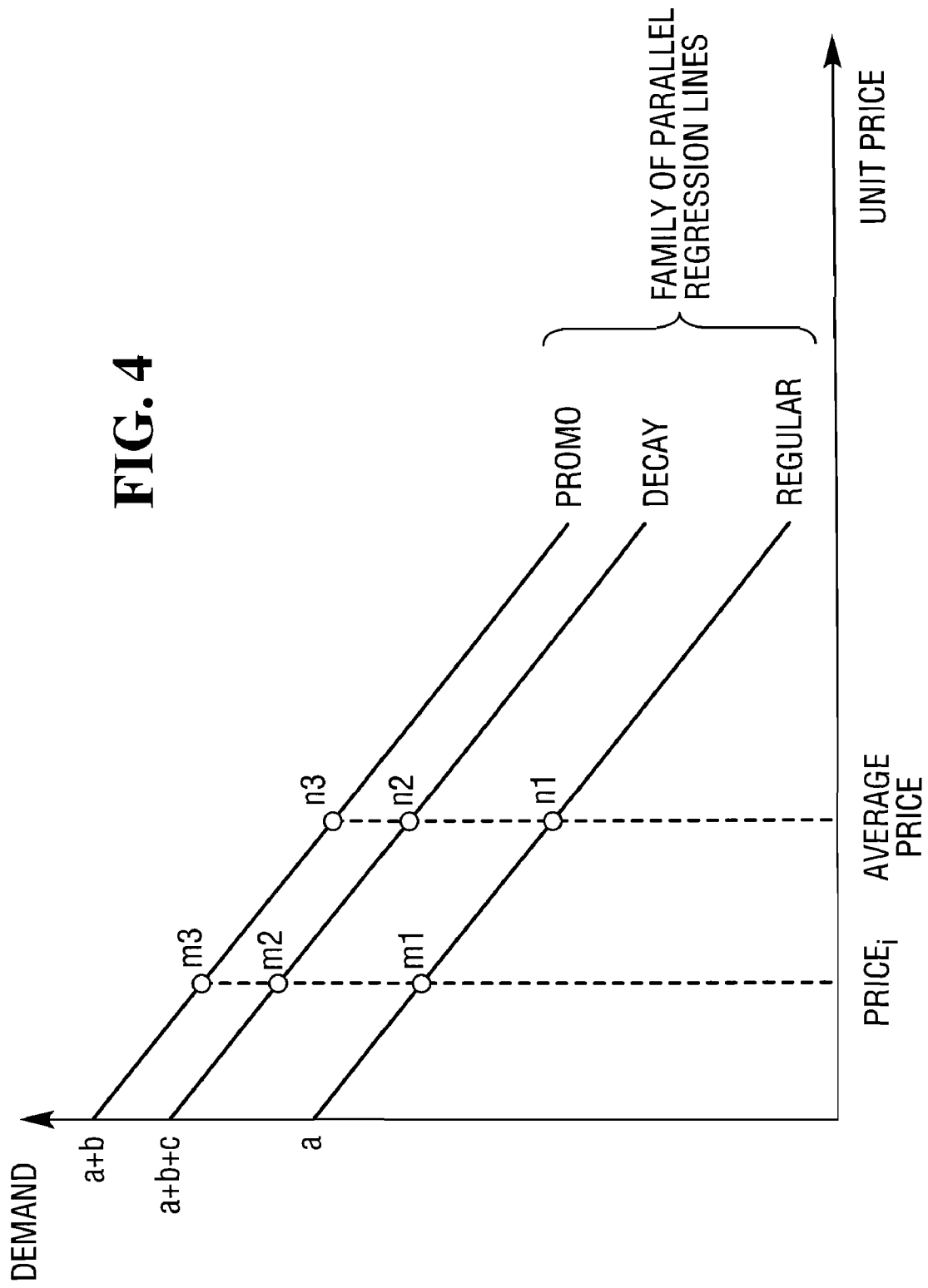
FIG. 4 provides graph including a family of regression lines illustrating the effects of promotions and price on product demand.

The above regression model forms a family of parallel regression lines, as shown in FIG. 4. Referring to FIG. 4, three regression lines are illustrated, labeled PROMO, DECAY and REGULAR. The REGULAR regression line illustrates the relationship between product demand and product unit price, wherein product demand is shown to decline with an increasing product price. Similarly, the PROMO regression line illustrates the relationship between product demand and product unit price during product promotional activities. The increase in demand at a selected price of the demand shown on the PROMO regression line over that shown on the REGULAR regression line, e.g., demand value m3 over m1, is the promotional uplift. The DECAY line includes the effects of both promotional and decay factors upon product demand.

From the three lines shown in FIG. 4, the following equations defining price effect and promotional effect can be determined:

$$\text{price effect} = priceX_i = \frac{m_j}{n_j}, \; j = 1, 2 \text{ or } 3 \qquad \text{Eq. (2)}$$

$$\text{promo effect} = promoX_i = \begin{cases} \dfrac{m_3}{m_1}, & \text{promo only} \\[4pt] \dfrac{m_2}{m_1}, & \text{promo \& decay} \end{cases} \qquad \text{Eq. (3)}$$

A multiplicative promo uplift, L, is calculated by transforming the regression equations using the following relations:

$$\begin{cases} priceX_i = \dfrac{m_3}{n_3} = \dfrac{a + b \cdot promo_k + c \cdot \text{decay} + d \cdot price_i}{a + b \cdot promo_k + c \cdot \text{decay} + d \cdot \overline{price}} \\ promoX_i = \dfrac{m_2}{m_1} = \dfrac{a + b \cdot promo_k + c \cdot \text{decay} + d \cdot price_i}{a + d \cdot \overline{price}} \end{cases} \quad \text{Eq. (4)}$$

where L=multiplicative promo uplift=promoXi×priceXi, and price is the overall average of the unit price.

Finally, L is input to the current ARS scheme for demand forecasting.

Figure 5:
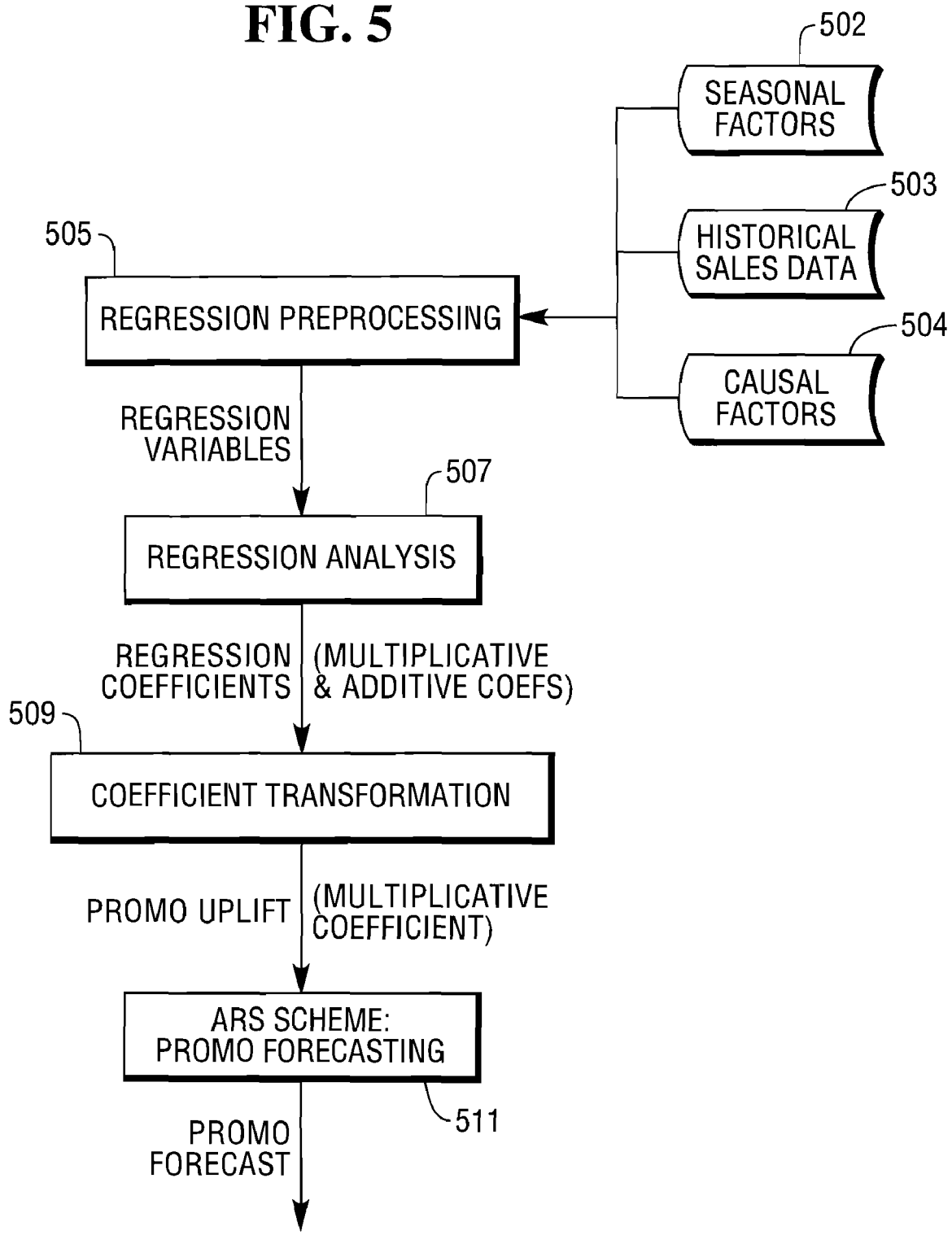
FIG. 5 is a flow chart illustrating an improved method for determining product demand forecasts during promotional periods in accordance with the present invention.

FIG. 5 is a flow chart illustrating the improved, casual method for forecasting promotional product demand discussed above. As part of the revised DCM demand forecasting process, seasonal adjustment factors 302, historical sales data 303, and tracked causal factors 504, are saved for each product or service offered by the retailer.

In steps 505 and 507, regression coefficients (a, b, c, d, ...) are calculated using seasonal factors 502, historical sales data 503, and causal factors 504. These regression coefficients are combined in step 509 to generate a single, multiplicative promotional uplift coefficient L, in accordance with Eq. (4), discussed above.

In step 511, the promotional uplift is then input into the DCM Average Rate of Sale (ARS) calculations performed within the Demand Forecasting module 113 to estimate the promotional demand forecast.

CONCLUSION

The Figures and description of the invention provided above reveal a novel system utilizing a causal methodology, based on multivariable regression techniques, to determining product demand forecasts during product promotional periods. The foregoing description of various embodiments of the invention has been presented for purposes of illustration and description. It is not intended to be exhaustive or to limit the invention to the precise form disclosed. Many alternatives, modifications, and variations will be apparent to those skilled in the art in light of the above teaching. Accordingly, this invention is intended to embrace all alternatives, modifications, equivalents, and variations that fall within the spirit and broad scope of the attached claims.

What is claimed is:

1. A method computer-implemented for forecasting product demand for a product during a future promotional period, the method comprising the steps of:

maintaining, in a data storage device, a database of historical product demand information;

calculating, by a computer in communication with said data storage device, a revised demand forecast for said product during said future promotional period from said historical product demand information;

identifying a plurality of causal factors influencing demand for said product during prior promotional periods;

analyzing, by said computer said historical product demand information for said product to determine a plurality of regression coefficients corresponding to said plurality of causal factors, said plurality of regression coefficients and corresponding causal factors being related through a multivariable regression equation: demand=a+b·$promo_k$+c·decay+d·price; wherein $promo_k$ is a binary promotional flag for a media type k; decay is a binary flag indicating promotional decay; price, is a unit price for said product for a given week; and a, b, c, and d are said regression coefficients;

blending, by said computer, said plurality of regression coefficients to determine a single, multiplicative promotional uplift coefficient, said blending of said plurality of regression coefficients to determine a single, multiplicative promotional uplift coefficient comprising combining regression coefficients a, b, c, and d; and combining, by said computer, said multiplicative promotional uplift coefficient with said revised demand forecast for said product to determine a promotional product demand for a product during a future promotional period.

2. A system for forecasting promotional demand for a product, comprising:

a data storage device containing a database of historical product demand information for a plurality of products; and a computer in communication with said data storage device, said computer executing a product forecasting application for:

calculating a revised demand forecast for said product during said future promotional period from said historical product demand information;

identifying a plurality of causal factors influencing demand for said product during prior promotional periods;

analyzing said historical product demand information for said product to determine a plurality of regression coefficients corresponding to said plurality of causal factors, said plurality of regression coefficients and corresponding causal factors being related through a multivariable regression equation: demand=a+b·$promo_k$+c·decay+d·price; wherein $promo_k$ is a binary promotional flag for a media type k; decay is a binary flag indicating promotional decay; price, is a unit price for said product for a given week; and a, b, c, and d are said regression coefficients;

blending said plurality of regression coefficients to determine a single, multiplicative promotional uplift coefficient, said blending of said plurality of regression coefficients to determine a single, multiplicative promotional uplift coefficient comprising combining regression coefficients a, b, c, and d; and combining said multiplicative promotional uplift coefficient with said revised demand forecast for said product to determine a promotional product demand for a product during a future promotional period.

\* \* \* \* \*